(12) United States Patent
Aluru et al.

(10) Patent No.: US 11,989,926 B1
(45) Date of Patent: May 21, 2024

(54) METHOD TO MONITOR WHEEL HEALTH AND ALIGNMENT USING CAMERA SYSTEM FOR PROACTIVE VEHICLE MAINTENANCE

(71) Applicant: GM GLOBAL TECHNOLOGY OPERATIONS LLC, Detroit, MI (US)

(72) Inventors: Sai Vishnu Aluru, Commerce Township, MI (US); Steffen P. Lindenthal, Oshawa (CA); Sravan Daruri, Walled Lake, MI (US)

(73) Assignee: GM GLOBAL TECHNOLOGY OEPRATIONS LLC, Detroit, MI (US)

( * ) Notice: Subject to any disclaimer, the term of this patent is extended or adjusted under 35 U.S.C. 154(b) by 56 days.

(21) Appl. No.: 18/061,770

(22) Filed: Dec. 5, 2022

(51) Int. Cl.
| | | |
|---|---|---|
| *G06V 10/75* | (2022.01) | |
| *G06V 10/22* | (2022.01) | |
| *G06V 20/56* | (2022.01) | |

(52) U.S. Cl.
CPC .......... *G06V 10/759* (2022.01); *G06V 10/225* (2022.01); *G06V 20/56* (2022.01)

(58) Field of Classification Search
CPC ....... B60R 1/002; B60R 1/22; B60R 1/23–27; G06V 20/56
See application file for complete search history.

(56) References Cited

U.S. PATENT DOCUMENTS

| | | | | |
|---|---|---|---|---|
| 10,078,892 B1* | 9/2018 | Wang | ..................... | B60C 11/246 |
| 2018/0111553 A1* | 4/2018 | Kubota | ..................... | B60R 1/00 |
| 2022/0379332 A1* | 12/2022 | Paolozzi | .................. | G06T 7/60 |
| 2023/0052176 A1* | 2/2023 | Pesik | ......................... | G06T 7/73 |
| 2023/0202394 A1* | 6/2023 | Wei | ............................ | G06T 7/73 348/148 |
| 2023/0410527 A1* | 12/2023 | Karve | ..................... | B60R 11/04 |

* cited by examiner

*Primary Examiner* — Jayanti K Patel
*Assistant Examiner* — Christopher Kingsbury Glover
(74) *Attorney, Agent, or Firm* — Lorenz & Kopf LLP (57) ABSTRACT

In exemplary embodiments, methods and systems are provided that include or utilize one or more automotive equipped cameras and a processor. The one or more automotive equipped cameras are configured to be onboard a vehicle and to obtain camera images during operation of the vehicle, the camera images including a view of one or more wheels of the vehicle. The processor is coupled to the one or more cameras, and is configured to at least facilitate: processing the camera images; and determining one or more states of the one or more wheels, including an alignment thereof, a health thereof, or both, based on the processing of the camera images.

20 Claims, 8 Drawing Sheets

METHOD TO MONITOR WHEEL HEALTH AND ALIGNMENT USING CAMERA SYSTEM FOR PROACTIVE VEHICLE MAINTENANCE

INTRODUCTION

The technical field generally relates to vehicles and, more specifically, to methods and systems for monitoring wheel alignment and wheel health for vehicle maintenance.

Various vehicles are equipped today with cameras for assisting with vehicle movement. However, in certain circumstances it may be possible for wheel alignment and/or wheel health to change.

Accordingly, it is desirable to provide improved methods and systems for monitoring wheel alignment and wheel health. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes: obtaining camera images from one or more automotive equipped cameras onboard a vehicle during operation of the vehicle, the camera images including a view of one or more wheels of the vehicle; processing the camera images, via a processor; and determining, via the processor, one or more states of the one or more wheels, including an alignment thereof, a health thereof, or both, based on the processing of the camera images.

Also in an exemplary embodiment, the camera images are obtained from one or more cameras that are protruding from or located on a fender or pillar of the vehicle of the vehicle.

Also in an exemplary embodiment, the determining of the one or more states of the one or more wheels is based at least in part on a comparison of the camera images with a baseline camera image stored in a computer memory.

Also in an exemplary embodiment, the step of determining the one or more states includes determining the alignment of the one or more wheels, via the processor, based on the processing of the camera images and the comparison of the camera images with the baseline camera image.

Also in an exemplary embodiment, the step of determining the one or more states includes determining a cupping of the one or more wheels, via the processor, based on the processing of the camera images and the comparison of the camera images with the baseline camera image.

Also in an exemplary embodiment, the determining of the one or more states of the one or more wheels is performed continuously and in real time during operation of the vehicle.

Also in an exemplary embodiment, the determining of the one or more states of the one or more wheels is performed after a determination is made that the vehicle has contacted an obstacle along a roadway in which the vehicle is travelling.

Also in an exemplary embodiment: the processing of the camera images includes extraction, super position and comparison of polygons in a region of the camera images, and monitoring changes in location of the one or more wheels with respect to the polygon; and the determining of the one or more states of the one or more wheels is made by the processor based on the changes in location of the one or more wheels with respect to the polygon.

Also in an exemplary embodiment: the processing of the camera images includes extraction, super position and comparison of triangles in the region of the camera images, determining a centerline associated with the triangle, and monitoring changes in location of the one or more wheels with respect to the centerline of the triangle; and the determining of the one or more states of the one or more wheels is made by the processor based on the changes in location of the one or more wheels with respect to the centerline of the triangle.

Also in an exemplary embodiment, the method further includes determining, via the processor, a number of times in which the one or more wheels have contacted an obstacle along a roadway in which the vehicle is travelling, based on how many times the one or more wheels have crossed the centerline of the triangle in the camera images; wherein the determining of the one or more states of the one or more wheels is made by the processor based on how many times the one or more wheels have crossed the centerline of the triangle in the camera images.

In another exemplary embodiment, a system is provided that includes one or more automotive equipped cameras and a processor. The one or more automotive equipped cameras are configured to be onboard a vehicle and to obtain camera images during operation of the vehicle, the camera images including a view of one or more wheels of the vehicle. The processor is coupled to the one or more cameras, and is configured to at least facilitate: processing the camera images; and determining one or more states of the one or more wheels, including an alignment thereof, a health thereof, or both, based on the processing of the camera images.

Also in an exemplary embodiment, the processor is configured to at least facilitate determining the one or more states of the one or more wheels based at least in part on a comparison of the camera images with a baseline camera image stored in a computer memory.

Also in an exemplary embodiment, the processor is configured to at least facilitate determining the alignment of the one or more wheels based on the processing of the camera images and the comparison of the camera images with the baseline camera image.

Also in an exemplary embodiment, the processor is configured to at least facilitate determining a cupping of the one or more wheels based on the processing of the camera images and the comparison of the camera images with the baseline camera image.

Also in an exemplary embodiment, the processor is further configured to at least facilitate: extraction, super position and comparison of polygons in a region of the camera images, and monitoring changes in location of the one or more wheels with respect to the polygon; and determining the one or more states of the one or more wheels based on the changes in location of the one or more wheels with respect to the polygon.

Also in an exemplary embodiment, the processor is further configured to at least facilitate: extraction, super position and comparison of triangles in the region of the camera images, determining a centerline associated with the triangle, and monitoring changes in location of the one or more wheels with respect to the centerline of the triangle; and determining the one or more states of the one or more wheels based on the changes in location of the one or more wheels with respect to the centerline of the triangle.

Also in an exemplary embodiment, the processor is further configured to at least facilitate: determining a number of times in which the one or more wheels have contacted an obstacle along a roadway in which the vehicle is travelling, based on how many times the one or more wheels have crossed the centerline of the triangle in the camera images; and determining of the one or more states of the one or more wheels based on how many times the one or more wheels have crossed the centerline of the triangle in the camera images.

In another exemplary embodiment, a vehicle is provided that includes a body, a drive system, one or more automotive equipped cameras, and a processor. The drive system is configured to move the body. The one or more automotive equipped cameras are configured to obtain camera images during operation of the vehicle, the camera images including a view of one or more wheels of the vehicle. The processor is coupled to the one or more cameras, and is configured to at least facilitate: processing the camera images; and determining one or more states of the one or more wheels, including an alignment thereof, a health thereof, or both, based on the processing of the camera images.

Also in an exemplary embodiment, the processor is configured to at least facilitate determining the one or more states of the one or more wheels based at least in part on a comparison of the camera images with a baseline camera image stored in a computer memory.

Also in an exemplary embodiment, the vehicle further includes one or more cameras that are protruding from or located on a fender or pillar of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
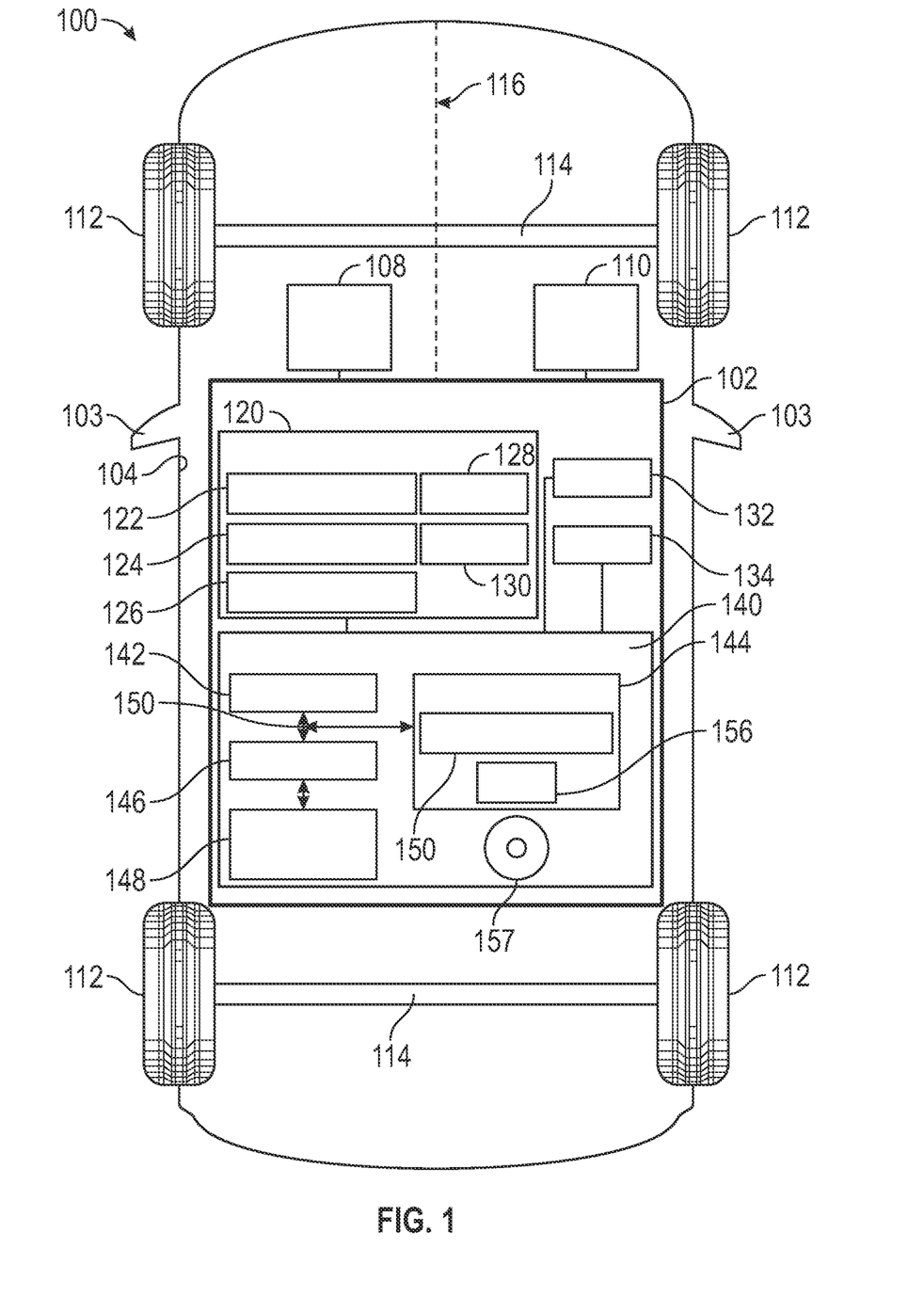
FIG. 1 is a functional block diagram of a vehicle that includes a plurality of wheels and a control system for monitoring alignment and health of the wheels, in accordance with exemplary embodiments.

FIG. 1 illustrates a vehicle 100, according to an exemplary embodiment. In various embodiments, the vehicle 100 includes a plurality of wheels 112, along with a control system 102 configured for monitoring alignment and health of the wheels 112. As described in greater detail further below, the control system 102 includes one or more side cameras 122 that are configured for obtaining camera images of the vehicle 100, including of one or more of the wheels 112 of the vehicle 100. Also as described in greater detail further below, the control system 102 further includes a processor 142 that is configured for processing the camera images and monitoring alignment and health of the wheels 112 based on the processed camera images.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

As depicted in FIG. 1, the vehicle 100 includes a body 104 that is arranged on a chassis 116. The body 104 substantially encloses other components of the vehicle 100. The body 104 and the chassis 116 may jointly form a frame. As noted above, the vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. In various embodiments, the drive system 110 comprises a propulsion system. In various embodiments, the drive system 110 comprises one or more combustion engines and/or electric motor, with a transmission thereof. In certain embodiments, the drive system 110 (also referred to herein as the propulsion system 110) may vary, and for example may also include one or more other types of motors, engines, and/or systems.

As depicted in FIG. 1, the vehicle 100 also includes a steering system 108. In exemplary embodiments, the steering system 108 controls steering of the vehicle 100 using steering components that are controlled via inputs provided by a driver, such as an accelerator pedal and/or via automatic control via the control system 102 (for example, with acceleration requested by the drive system 110 and/or the control system 102).

In the embodiment depicted in FIG. 1, the control system 102 is coupled to the steering system 108 and the drive system 110. In various embodiments, the control system 102 may also be coupled to one or more other systems and/or components of the vehicle 100. Also as depicted in FIG. 1, in various embodiments, the control system 102 includes a sensor array 120 and a controller 140. In certain embodiments, the control system 102 may also include a display 132 and a transceiver 134, among other possible components.

In various embodiments, the sensor array 120 includes various sensors that obtain sensor data for use in monitoring the alignment and health of the wheels 112. In the depicted embodiment, the sensor array 120 includes the above-mentioned side cameras 122. In various embodiments, the sensor array 120 also includes one or more other cameras 124, other detection sensors 126, steering sensors 128, and speed sensors 130, among other possible sensors.

As noted above, the side cameras 122 capture camera images on one or more sides of the vehicle 100, including capture images featuring one or more wheels 112 of the vehicle 100. In certain embodiments, the side cameras 122 are disposed on the body 104 of the vehicle 100 at one or more locations to capture camera images of one or more wheels 112 of the vehicle 100. In certain embodiments, the side cameras 122 are mounted on or otherwise disposed on or coupled to one or more side view mirrors 103 of the vehicle 100 as depicted in FIG. 1, and/or may be protruding from a front and/or rear fender of the vehicle 100, and/or from one or pillars (such and one or more A/B/C pillars) of the vehicle 100, among other locations in various embodiments.

In various embodiments, the one or more other cameras 124 are disposed on one more other locations of the vehicle 100 (different from the side cameras 122), and capture camera images at one or more different locations and/or views with respect to the vehicle 100 and/or the roadway on which the vehicle 100 is driving. In certain embodiments, the other cameras 124 may include one or more underbody cameras disposed beneath the body 104 of the vehicle 100. However, the other cameras 124 may also be disposed on one or more other locations of the vehicle 100, such as proximate a front end of the vehicle 100, a rear end of the vehicle 100, and/or on a roof or top of the vehicle 100 in different embodiments.

In various embodiments, the other detection sensors 126 include one or more other types of sensors that detect curbs, potholes, and/or other objects and/or features of the roadway on which the vehicle 100 is travelling. In various embodiments, the other detection sensors 126 may include one or more Lidar, sonar, radar, and/or other detection sensors.

In various embodiments, the steering sensors 128 measure one or more steering angles for the vehicle 100. In certain embodiments, the steering sensors are part of or coupled to a steering wheel of the vehicle 100, and/or to a steering column coupled thereto. In certain other embodiments, the steering sensors 128 may be coupled to one or more of the wheels 112 and/or axles 114.

In various embodiments, the speed sensors 130 measure an amount of speed (and/or changes thereof) of the vehicle 100. In certain embodiments, the speed sensors 130 comprise wheel speed sensors that measure a speed of one or more of the wheels 112 of the vehicle 100. In certain other embodiments, the speed sensors 130 may comprise one or more accelerometers and/or one or more other types of sensors that measure parameters pertaining to movement of the vehicle 100.

In various embodiments, the controller 140 is coupled to the sensor array 120, as well as to the steering system 108 and the drive system 110 of the vehicle 100. In certain embodiments, the controller 140 may also be coupled to one or more other components of the vehicle 100.

In various embodiments, the controller 140 receives sensor data from the sensor array 120 (including camera images from the side cameras 122 as well as additional sensor data from other sensors of the sensor array 120), processes the camera images, and monitors the alignment and health of the wheels 112 of the vehicle 100 based on the processed camera images and the other sensor data. In various embodiments, the controller 140 performs these functions in accordance with the process 200 of FIG. 2, along with the implementations thereof of FIGS. 3-10, and as described in greater detail in connection therewith.

In various embodiments, the controller 140 comprises a computer system (and is also referred to herein as computer system 140), and includes a processor 142, a memory 144, an interface 146, a storage device 148, and a computer bus 150. In various embodiments, the controller (or computer system) 140 monitors the alignment and health of the wheels 112 of the vehicle 100 using the camera images and other sensor data, in accordance with the process 200 of FIG. 2, along with the implementations thereof of FIGS. 3-10, and as described in greater detail in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems. Accordingly, in certain embodiments the controller 140 and/or various components (such as the processor 142 described below) may be disposed onboard the vehicle 100. However, in certain other embodiments, the controller 140 and/or various components (such as the processor 142) may disposed remote from the vehicle 100, such as a remote server, and for example may operate remotely via cloud processing, and so on.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIG. 2 and the implementations of FIGS. 3-10 and as described further below in connection therewith.

In various embodiments, the processor 142 utilizes the camera images and other sensor data for monitoring the alignment and health of the wheels 112. In addition, in various embodiments, the processor 142 provides instructions for providing the results to one or more users of the vehicle 100 (e.g., to a driver, or to a monitoring service, or to one or more other users), such as via the display 132 and/or transceiver 134 of FIG. 1, for example so that appropriate maintenance may be performed for the wheels 112. In certain embodiments, the processor 142 may also provide instructions for executing one or more other vehicle control actions, such as steering and/or acceleration of the vehicle 100 via the steering system 108 and/or drive system 110, respectively, among other possible vehicle control actions.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with one or more stored values 156, including for control of the trailer 101 based on the processing of the sensor data that is obtained from the sensor array 120.

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120, among other possible data sources. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of one or more processes of the present disclosure, such as the steps of the process 200 of FIG. 2 and implementations of FIGS. 3-10 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

In various embodiments, the display 132 provides one or more indications of the alignment and/or health of the wheels 112 in accordance with instructions provided by the processor 142. In various embodiments, such indications may include one or more audible, visual, haptic and/or other notifications and/or alerts for the driver and/or for one or more other users of the vehicle 100 as to the alignment and health of the wheels 112 and/or recommendations for maintenance and/or replacement of the wheels 112, and so on.

In various embodiments, the transceiver 134 is also used for providing one or more indications of the alignment and/or health of the wheels 112 in accordance with instructions provided by the processor 142. In various embodiments, the processor 142 sends one or more electronic messages with notifications and/or alerts for the driver and/or for one or more other users of the vehicle 100 as to the alignment and health of the wheels 112 and/or recommendations for maintenance and/or replacement of the wheels 112, and so on.

Figure 2:
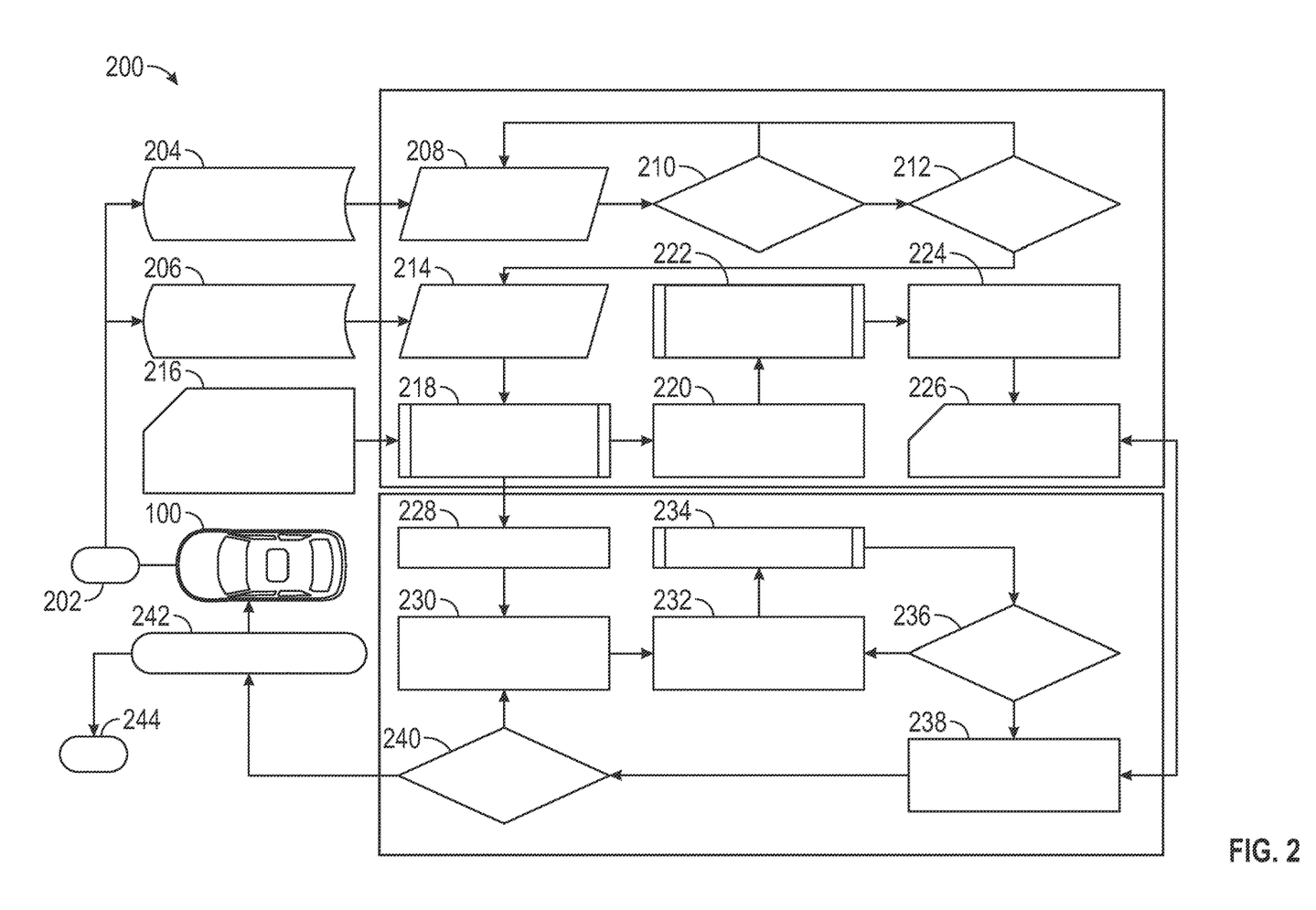
FIG. 2 is a flowchart of a process for monitoring alignment and health of wheels of a vehicle, and that can be implemented in connection with the vehicle, including the control system thereof, of FIG. 1.

FIG. 2 provides a flowchart of process 200 for monitoring alignment and health of wheels of a vehicle, in accordance with exemplary embodiments. Also in exemplary embodiments, the process 200 can be implemented in connection with the vehicle 100, including the control system 102 thereof. The process 200 is described below with reference to FIG. 2 as well as to FIGS. 3-10, which depict exemplary implementations of the process 200 as set forth further below. In various embodiments, the various steps of FIG. 2 are performed in real time as the vehicle 100 is being operated on a roadway.

As depicted in FIG. 2, the process 200 begins at step 202. In one embodiment, the process 200 begins when a vehicle is turned "on" or begins operation, for example during a current vehicle drive. For example, in various embodiments, the process 200 may also begin when a driver approaches or enters the vehicle 100, or when the driver turns on the vehicle and/or a driver system or motor therefor (e.g. by turning a key, engaging a keyfob or start button, and so on). In one embodiment, the steps of the process 200 are performed continuously during operation of the vehicle. In certain embodiments, the process 200 may begin subsequent to a beginning of a current vehicle drive or ignition cycle, for example once the vehicle 100 has contacted a curb, a pot-hole, and/or other obstacle on a roadway in which the vehicle 100 is being operated (e.g., as determined via sensor data provided by the other cameras 124 and/or other detection sensors 126 of FIG. 1).

In various embodiments, vehicle logistics are obtained in steps 204 and 206. Specifically, in various embodiments, sensor data is obtained at steps 204 and 206. In various embodiments, sensor data is obtained via each of the sensors of the vehicle's sensor array 120 of FIG. 1.

In certain embodiments, the sensor data of step 204 includes sensor data as to the operation of the vehicle 100 and as to the roadway on which the vehicle 100 is travelling. In certain embodiments, the sensor data of step 204 includes a steering angle of the vehicle 100, as obtained via one or more steering sensors 128 of FIG. 1. In addition, also in various embodiments, the sensor data of step 204 may also include, among other possible sensor data: detection data as to a roadway on which the vehicle 100 is travelling from the other cameras 124 and/or other detection sensors 126 of FIG. 1 and/or a vehicle speed from the speed sensors 130 of FIG. 1.

Also in various embodiments, camera images are obtained during step 204. In various embodiments, during step 204, camera images are obtained from the side cameras 122 of one or more portions of the vehicle 100, including one or more wheels 112 of the vehicle 100. In various embodiments, the camera images are obtained from the side cameras 122 as to one or more sides of the vehicle 100, including one or more of the wheels 112. Also in certain embodiments, additional cameras images are also obtained from one or more other cameras 124 of FIG. 1 (e.g., one or underbody cameras) that include camera angles of portions of the vehicle 100, including one or wheels 112 thereof, from one or more different angles. In various embodiments, the camera images are obtained and processed continuously throughout the process 200, including for comparison with one another and monitoring alignment and health for the wheels 112 of the vehicle 100.

In various embodiments, a steering angle is determined (step 208). In various embodiments, the steering angle is determined by the processor 142 of FIG. 1 based on the sensor data of step 204. Alternatively, in certain embodiments, the steering angle may instead be determined by the steering sensors 128 of FIG. 1 and provided to the processor 142 for further processing.

In various embodiments, a determination is made as to whether the steering angle is greater than a predetermined threshold (step 210). In certain embodiments, the predetermined threshold is equal to zero, or approximately zero; however, this may vary in other embodiments. Also in various embodiments, this determination is made by the processor 142 of FIG. 1.

In various embodiments, if it is determined that the steering angle is not greater than the predetermined threshold, then the process returns to step 208 for updated steering angle values with new sensor data. In various embodiments, steps 208 and 210 repeat in this manner until a determination is made during in iteration of step 210 that the steering angle is greater than the predetermined threshold.

Once it is determined in an iteration of step 210 that the steering angle is greater than the predetermined threshold, a determination is made as to whether the steering angle is angle to the left or to the right (step 212). Also in various embodiments, this determination is made by the processor 142 of FIG. 1.

In various embodiments, if it is determined during step 212 that the steering angle is not angled to either the left or the right, then the process returns to step 208 for updated steering angle values with new sensor data. In various embodiments, steps 208-212 repeat in this manner until a determination is made during in iteration of step 212 that the steering angle is angled to the left or right.

Once it is determined in an iteration of step 212 that the steering angle is angled to the left or right, the process proceeds to step 214, described below.

During step 214, camera image frames are obtained. In various embodiments, the camera frames are obtained from one or more automotive equipped cameras that are onboard the vehicle 100. In various embodiments, the camera images are obtained from the side cameras 122 from step 206. In certain embodiments, camera images may also be obtained from one or more of the other cameras 124 of FIG. 1.

Figure 3:
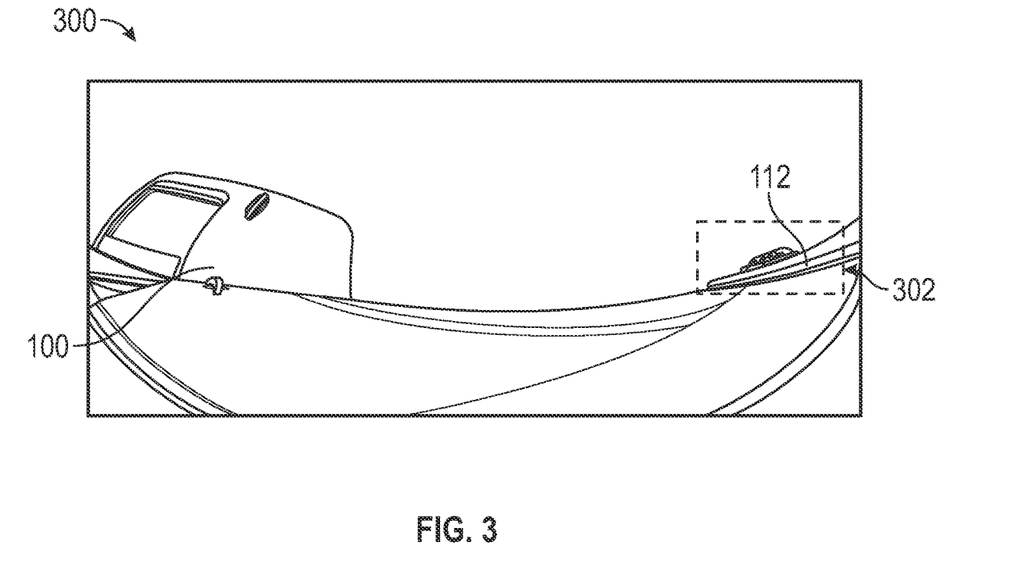
FIGS. 3-7 depict illustrative camera images that are processed in connection with the process of FIG. 2, in accordance with exemplary embodiments.
Figure 4:
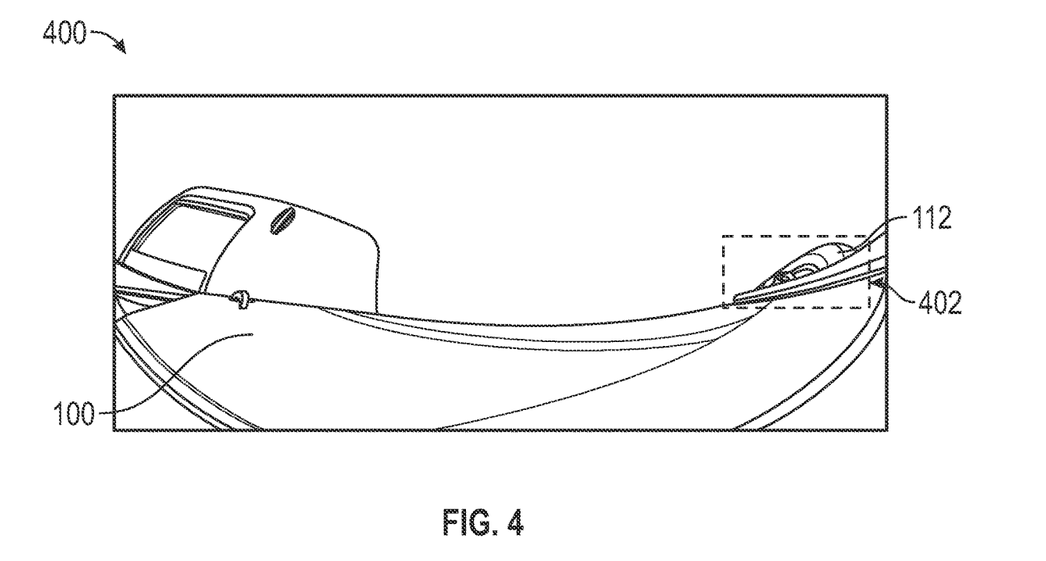

With reference to FIGS. 3 and 4, representative camera images are provided. Specifically, FIG. 3 provides a first exemplary image 300, including a region of interest 302, in which the illustrated wheel 112 is relatively straight (e.g., corresponding to a steering angle that is approximately equal to zero, and a steering wheel that is straight). In addition, FIG. 4 provides a second exemplary image 400, including a region of interest 402, in which the illustrated wheel 112 is angled to the left (e.g., corresponding to a steering angle that is non-zero, and a steering wheel that is angled to the left). It will be appreciated that in other embodiments, the wheel 112 may similarly be angled to the right (e.g., when the steering wheel is angled to the right).

With reference back to FIG. 2, in various embodiments, one or more calibratable thresholds are obtained (step 216). In various embodiments, the processor 142 of FIG. 1 retrieves the calibratable thresholds from the memory 144 of FIG. 1, from one or more stored values 156 thereof. Also in various embodiments, the calibratable thresholds refer to one or more values of additional pixels for processing of the camera images.

Also in various embodiments, cropping of the camera images is performed (step 218). In various embodiments, the camera image frames of step 214 are cropped during step 218 by the processor 142 of FIG. 2 based on a region of interest that includes a region of interest that includes a wheel 112 of the vehicle 100.

Figure 5:
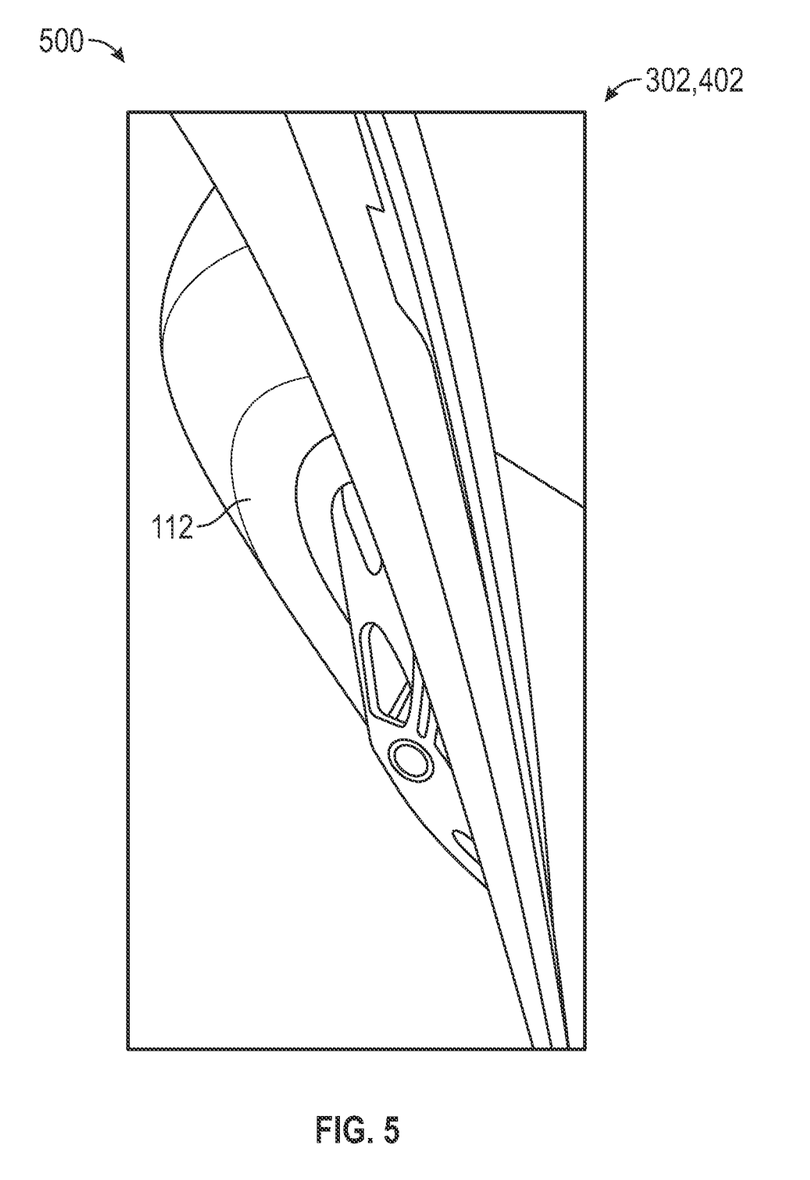

With references to FIGS. 3-5, an illustration of the cropping is provided in accordance with an exemplary embodiment. Specifically, in an exemplary embodiment, a region of interest such as the region of interest 302 of FIG. 3 or the region of interest 402 of FIG. 4 is utilized for the cropping. Also in an exemplary embodiment, the cropping results in a cropped image 500 as depicted in FIG. 5, which includes the applicable region of interest 302 or 402.

With reference back to FIG. 2, in various embodiments, following the cropping of step 218, the process 200 proceeds along two different directions, namely: (i) a first path to steps 220-226 as part of a wheel health learning function or sub-process; and (ii) a second path to steps 228-242 as part of a wheel health evaluation function or sub-process. In various embodiments, these first and second paths are performed simultaneously; however, this may vary in certain other embodiments.

In various embodiments, as part of the first path (or learning function or sub-process), the process proceeds to step 220. In various embodiments, during step 220, the pixels are binarized. In various embodiments, this is performed by the processor 142 of FIG. 1. In various embodiments, binary numbers are assigned to each pixel of the cropped image.

Also in various embodiments, a polygon is determined (step 222). In various embodiments, the processor 142 computes a polygon for the cropped image for the cropped image of step 218, using the binarization of the pixels of step 220. In various embodiments, during step 222, a triangle is computed for the cropped image. In various embodiments, extraction, super position and comparison of polygons (e.g., triangles) are performed in a region of the cropped image, particularly a region of interest of the camera image frame that includes a wheel 112 of the vehicle 100.

Figure 6:
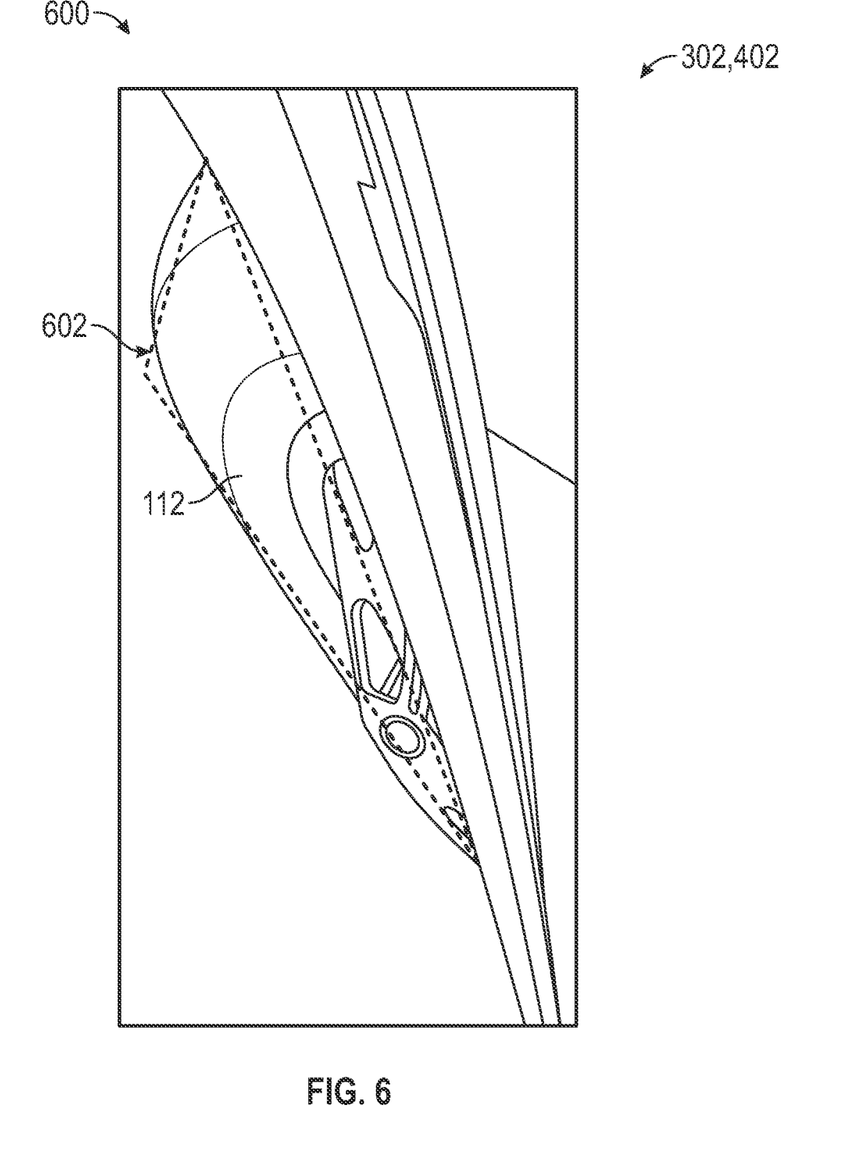

With reference to FIG. 6, the creation of the polygon of step 222 is illustrated, in accordance with an exemplary embodiment. Specifically, in FIG. 6, a further processed image 600 is provided for the cropped image of FIG. 5, in which a triangle 602 is provided on the region of interest in accordance with an exemplary embodiment.

With reference back to FIG. 2, in an exemplary embodiment, calculations are made with respect to the polygon (step 224). Specifically, in various embodiments, a median, a center of mass, a centerline through the median, and a centerline angle are calculated for the polygon from step 222. In various embodiments, these calculations are made by the processor 142 of FIG. 1.

Figure 7:
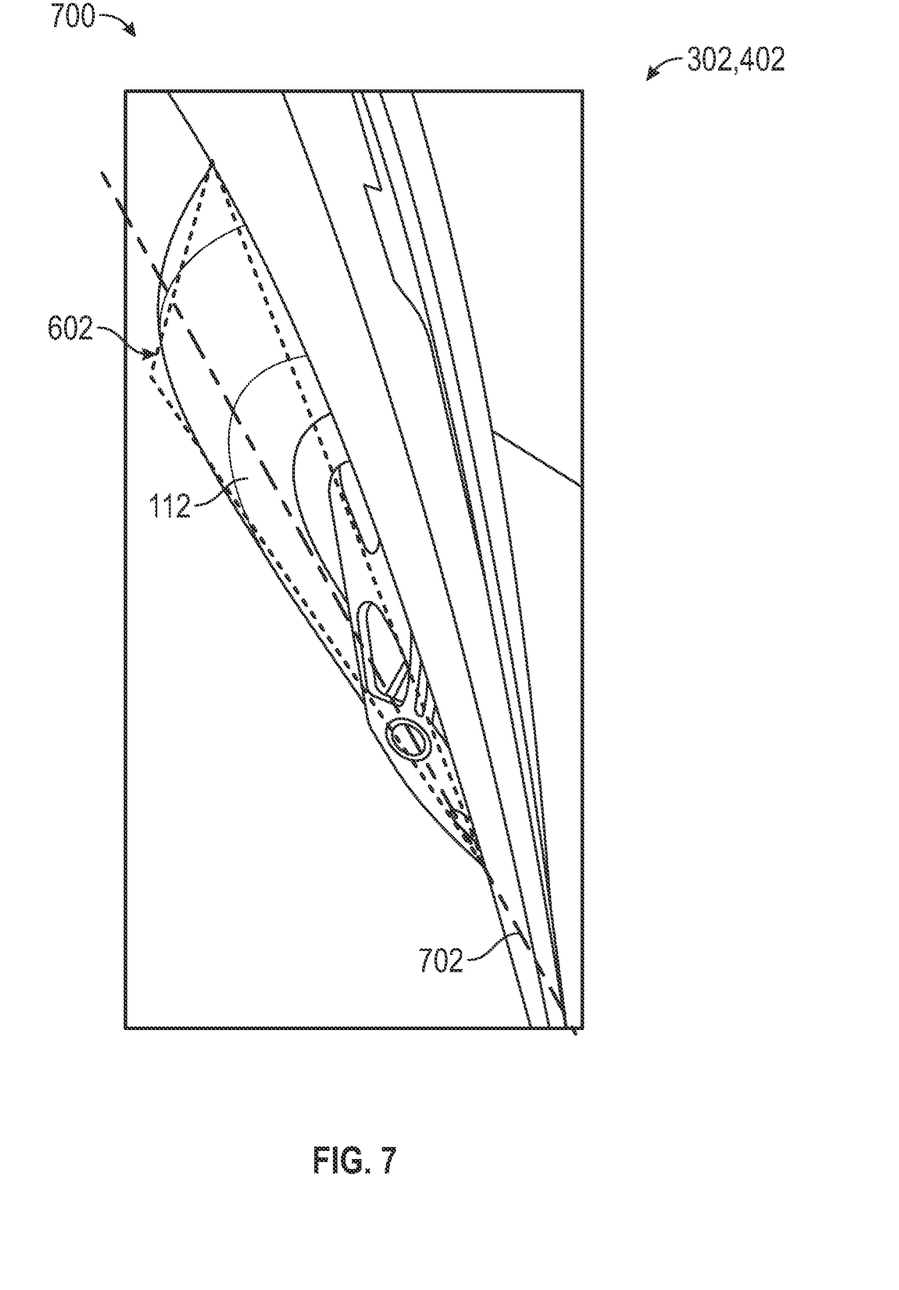

With reference to FIG. 7, an illustration is provided for the calculating of step 224. Specifically, FIG. 7 provides an illustration of a further processed image 700 including a centerline 702 of the polygon (i.e., the triangle of FIG. 7), by which the calculations are based in accordance with an exemplary embodiment.

With reference back to FIG. 2, in various embodiments, wheel data is stored (step 226). In various embodiments, the processor 142 of FIG. 1 stores the data from the calculations of step 224 into the memory 144 of FIG. 1 as stored values 156 therein. In various embodiments, the stored wheel data is utilized in step 238 (described further below) in the current iteration of the process 200. In certain embodiments, the stored wheel data is also utilized in future iterations of the process 200.

With reference back to step 218, following step 218, the process 200 also proceeds along a second path to steps 228-242 as part of a wheel health evaluation function or sub-process in various embodiments, as noted above.

In various embodiments, as part of the second path (or wheel health evaluation function or sub-process), the process proceeds to step 228. In various embodiments, during step 228, edges of the images are scanned. In various embodiments, this is performed by the processor 142 of FIG. 1.

Also in various embodiments, intersection points are determined (step 230). In various embodiments, during step 230, the processor 142 of FIG. 1 calculates points of intersection between the wheel 112 and the centerline of the image (e.g., the centerline 702 of FIG. 7 as discussed above).

Also in various embodiments, determinations are made as to whether the vehicle has encountered one or more obstacles (step 232). In various embodiments, the processor 142 of FIG. 1 determines whether the vehicle 100 has contacted any pot-holes, roadway curbs, or other obstacles based on the intersection points of step 230. Specifically, in certain embodiments, the vehicle 100 is determined to have encountered one or more such intersection points when the number of intersection points exceed a predetermined threshold.

In various embodiments, a count is performed (step 234). In various embodiments, the processor 142 of FIG. 1 counts how many times the vehicle 100 has encountered one or more obstacles in different iterations of step 232. In certain embodiments, the count may be limited to a particular vehicle drive or ignition cycle, and/or a particular predetermined amount of time. However, this may vary in other embodiments.

A determination is made as to whether the number of obstacle encounters has exceeded a predetermined threshold (step 236). In various embodiments, the processor 142 of FIG. 1 determines whether the count of step 234 has exceeded a predetermined threshold that is stored in the memory 144 of FIG. 1 as one or more stored values 156 thereof. In one exemplary embodiment this predetermined threshold is equal to, or approximately equal to, five. However, this may vary in other embodiments.

In various embodiments, if it is determined in step 236 that the count (i.e., the number of obstacle encounters) has not exceeded the predetermined threshold, the process returns to step 232, as the pothole detection continues (e.g., with updated camera images, sensor data, and processing thereof). In various embodiments, steps 232-236 repeat in new iterations until a determination is made during an iteration that the count has exceeded the predetermined threshold.

In various embodiments, once it is determined in an iteration that the count (i.e., the number of obstacle encounters) has exceeded the predetermined threshold, then the process proceeds to step 238, described below.

In various embodiments, during step 238, wheel status is monitored. In various embodiments, the alignment and health of the one or more wheels 112 in camera images is monitored by the processor 142 of FIG. 1 based on the processed camera images and the sensor data. In various embodiments, the monitoring of the status (e.g., alignment and health) of the wheel is based on a comparison of wheel angles and/or other associated data from the processed images and sensor data with known, expected baseline values that are stored in the memory 144 of FIG. 1 as stored values 156 thereof (e.g., in certain embodiments, form a vehicle manufacturer and/or other source of data as to what the wheel angles and/or other associated data are expected to be for healthy wheels 112 for the vehicle 100). In various embodiments, the wheel health is monitored with respect to wheel alignment, wheel cupping, and/or other measures of wheel health, including damage and/or wear and tear.

Figure 8:
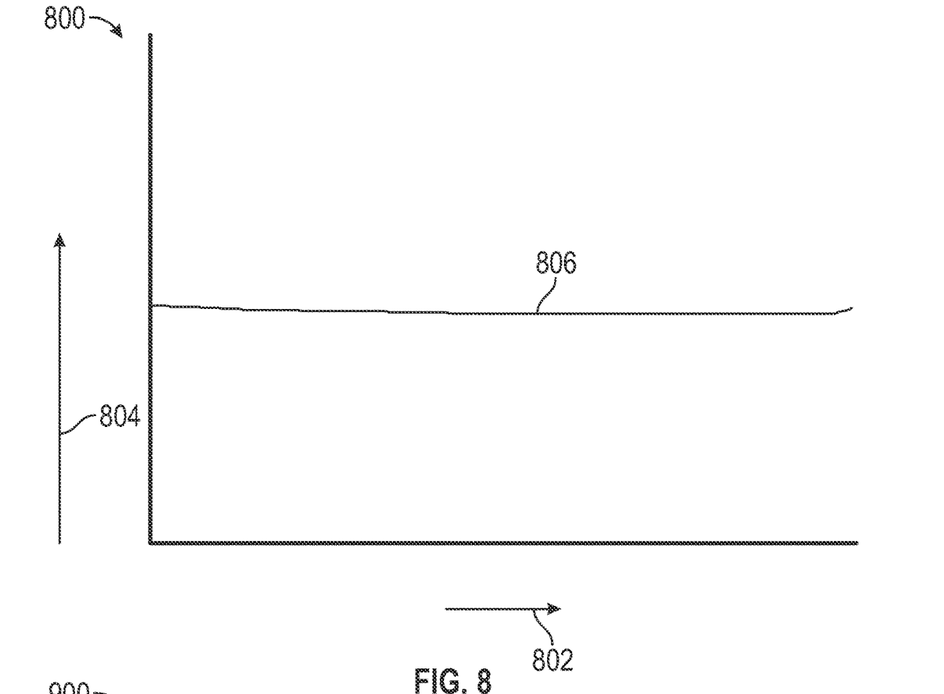
FIGS. 8-10 depict graphical illustrations of monitoring of wheels of a vehicle in connection with the process of FIG. 2, in accordance with exemplary embodiments.
Figure 9:
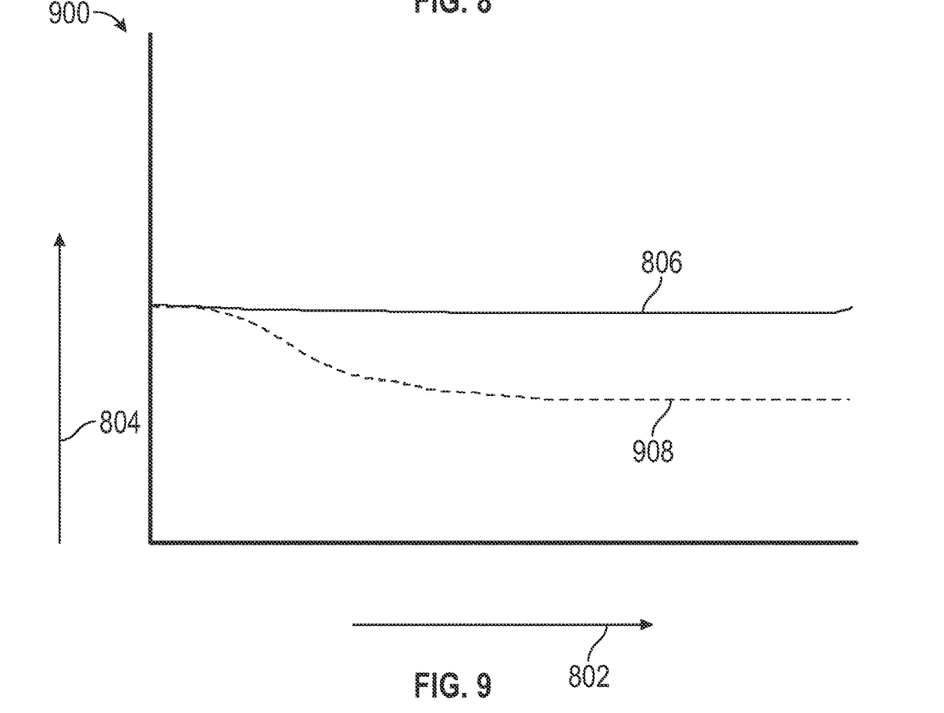
Figure 10:
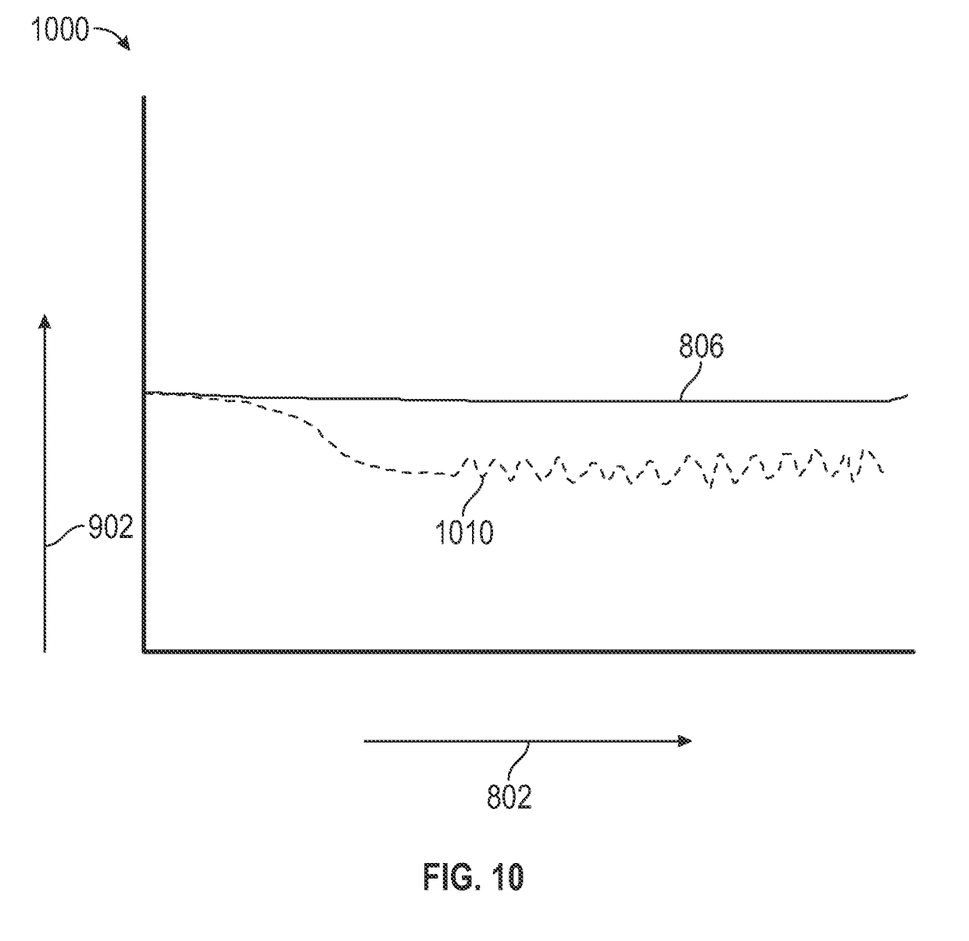

With reference now to FIGS. 8-10, illustrative examples are provided for implementations of the wheel health monitoring of step 238, in accordance with exemplary embodiments.

First, with respect to FIG. 8, a first graphical illustration 800 is provided in accordance with an exemplary embodiment. In FIG. 8 the x-axis 802 represents the number of camera image frames, and the y-axis 804 represents the wheel angle. As shown in FIG. 8, an ideal wheel angle 806 is expected to be relatively flat for a wheel 112 that is healthy (e.g., for a wheel 112 that is properly aligned and that has not experienced significant wheel coupling and/or other damage).

Next, with respect to FIG. 9, a second graphical illustration 900 is provided in accordance with an exemplary embodiment. Similar to FIG. 8, in FIG. 9 the x-axis 802 represents the number of camera image frames, and the y-axis 804 represents the wheel angle. However, in FIG. 9, the calculated wheel angle 908 differs from the ideal wheel angle 806. In an exemplary embodiment depicted in FIG. 9, the calculated wheel angle 908 represents a deflected wheel angle 908 with a relatively constant decrease as compared with the ideal wheel angle 806. In various embodiments, this result represents a misaligned wheel 112, and is recognized as such by the processor 142 of FIG. 1.

Finally, with respect to FIG. 10, a third graphical illustration 1000 is provided in accordance with an exemplary embodiment. Similar to FIGS. 8 and 9, in FIG. 10 the x-axis 802 represents the number of camera image frames, and the y-axis 804 represents the wheel angle. However, in FIG. 10, the calculated wheel angle 1010 differs from the ideal wheel angle 806 in a manner that is varying rather than being constant. For example, as shown in the example of FIG. 10, in this case the calculated wheel angle 1010 represents a deflected wheel angle 1010 that oscillates with respect to the ideal wheel angle 806. In various embodiments, this result represents a wheel 112 with wheel coupling, and is recognized as such by the processor 142 of FIG. 1.

With reference back to FIG. 2, in various embodiments, the results of the wheel alignment and health monitoring of step 238 are stored as wheel data as part of the above-described step 226. For example, in various embodiments, these results are stored in the memory 144 of FIG. 1 as stored values 156 thereof for subsequent use by the processor 142 in the current and/or future iterations of the process 200.

Also in various embodiments, the process also proceeds to step 240. During step 240, one or more determinations are made as to whether any issues with wheel status (e.g., alignment and health) are evident. Specifically, in various embodiments, the processor 142 determines whether any wheel misalignment, wheel coupling, and/or any other wheel health issues are deemed to be presents for one or more wheels 112 based on the processing of the camera images, including the wheel health monitoring of step 238.

In various embodiments, if it is determined in step 240 that no wheel status (e.g., alignment or health) issues are evident, then the process returns to step 230 in a new iteration. In various embodiments, steps 230-240 then repeat in new iterations until a determination is made in a subsequent iteration of step 240 that one or more wheel status (e.g., alignment or health) issues are evident (or, in various embodiments, until the current vehicle drive or ignition cycle is complete).

Conversely, in various embodiments, if it is determined in an iteration of step 240 that one or more wheel status (e.g., alignment or health) issues are evident, then the process proceeds to step 242. In various embodiments, during step 242, one or more notifications or other vehicle control actions are implemented. In certain embodiments, one or more alerts, warnings, and/or other notifications are provided for a driver or other user of the vehicle 100 and/or of a fleet to which the vehicle 100 belongs. In various embodiments, the notifications are provided via the display 132 and/or transceiver 134 of FIG. 1 in accordance with instructions provided by the processor 142 of FIG. 1. In various embodiments, the notifications may include audible notifications, visual notifications, electronic messages with the notifications, and so on. In various embodiments, the notifications include details as to the alignment, cupping, and/or other health and/or status issues pertaining to the wheels 112, along with one or more recommendations (e.g., for maintenance, repair, and/or replacement of the wheels 112). In certain embodiments, the processor 142 may also take one or more other control actions for the vehicle 100, such as controlling movement of the vehicle 100 via the steering system 108 and/or drive system 110, and so on.

In various embodiments, the process 200 then terminates (step 244). In addition, as alluded to above, in various embodiments the process 200 may also terminate after a current vehicle drive or ignition cycle is complete (regardless of whether any issues with wheel alignment or health have been detected).

Accordingly, methods, systems, and vehicles are provided for monitoring the alignment and health of wheels of a vehicle. In accordance with exemplary embodiments disclosed herewith, camera images are obtained from one or more side cameras of the vehicle. In various embodiments, a process of the vehicle processes the camera images and utilizes the processed camera images, along with other sensor data, to monitor the alignment and health of the wheels of the vehicle.

It will be appreciated that the systems, vehicles, and methods may vary from those depicted in the Figures and described herein. For example, the vehicle 100 of FIG. 1, the control system 102, and/or components may vary in different embodiments. It will similarly be appreciated that the steps of the process 200 may differ from that depicted in FIG. 2, and/or that various steps of the process 200 may occur concurrently and/or in a different order than that depicted in FIG. 2. It will similarly be appreciated that the subprocesses and implementations of FIGS. 3-10 may differ from those depicted in FIGS. 3-7 and/or as described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method comprising:
   obtaining camera images from one or more automotive equipped cameras onboard a vehicle during operation of the vehicle, the camera images including a view of one or more wheels of the vehicle;
   processing the camera images, via a processor, including by monitoring changes in location of the one or more wheels with respect to one or more triangles in the camera images; and
   determining, via the processor, one or more states of the one or more wheels, including an alignment thereof, a health thereof, or both, based on the processing of the camera images, including based on the changes in the location of the one or more wheels with respect to the one or more triangles.

2. The method of claim 1, wherein the camera images are protruding from or located on a fender or pillar of the vehicle.

3. The method of claim 1, wherein the determining of the one or more states of the one or more wheels is based at least in part on a comparison of the camera images with a baseline camera image stored in a computer memory.

4. The method of claim 3, wherein the step of determining the one or more states comprises determining the alignment of the one or more wheels, via the processor, based on the processing of the camera images and the comparison of the camera images with the baseline camera image.

5. The method of claim 3, wherein the step of determining the one or more states comprises determining a cupping of the one or more wheels, via the processor, based on the processing of the camera images and the comparison of the camera images with the baseline camera image.

6. The method of claim 1, wherein the determining of the one or more states of the one or more wheels is performed continuously and in real time during operation of the vehicle.

7. The method of claim 1, wherein the determining of the one or more states of the one or more wheels is performed after a determination is made that the vehicle has contacted an obstacle along a roadway in which the vehicle is travelling.

8. The method of claim 1, wherein:
   the processing of the camera images includes extraction, super position and comparison of polygons in a region of the camera images, the polygons comprising the one or more triangles, and monitoring changes in location of the one or more wheels with respect to the polygon; and
   the determining of the one or more states of the one or more wheels is made by the processor based on the changes in location of the one or more wheels with respect to the polygon.

9. The method of claim 8, wherein:
   the processing of the camera images includes extraction, super position and comparison of the one or more triangles in the region of the camera images, determining a centerline associated with the triangle, and monitoring changes in location of the one or more wheels with respect to the centerline of the triangle; and the determining of the one or more states of the one or more wheels is made by the processor based on the changes in location of the one or more wheels with respect to the centerline of the triangle.

10. The method of claim 9, further comprising:

determining, via the processor, a number of times in which the one or more wheels have contacted an obstacle along a roadway in which the vehicle is travelling, based on how many times the one or more wheels have crossed the centerline of the triangle in the camera images;

wherein the determining of the one or more states of the one or more wheels is made by the processor based on how many times the one or more wheels have crossed the centerline of the triangle in the camera images.

11. A system comprising:

one or more automotive equipped cameras that are configured to be onboard a vehicle and to obtain camera images during operation of the vehicle, the camera images including a view of one or more wheels of the vehicle; and a processor that is coupled to the one or more cameras and that is configured to at least facilitate:

processing the camera images, including by monitoring changes in location of the one or more wheels with respect to one or more triangles in the camera images; and determining one or more states of the one or more wheels, including an alignment thereof, a health thereof, or both, based on the processing of the camera images, including based on the changes in the location of the one or more wheels with respect to the one or more triangles.

12. The system of claim 11, wherein the processor is configured to at least facilitate determining the one or more states of the one or more wheels based at least in part on a comparison of the camera images with a baseline camera image stored in a computer memory.

13. The system of claim 12, wherein the processor is configured to at least facilitate determining the alignment of the one or more wheels based on the processing of the camera images and the comparison of the camera images with the baseline camera image.

14. The system of claim 12, wherein the processor is configured to at least facilitate determining a cupping of the one or more wheels based on the processing of the camera images and the comparison of the camera images with the baseline camera image.

15. The system of claim 11, wherein the processor is further configured to at least facilitate:

extraction, super position and comparison of polygons in a region of the camera images, the polygons comprising the one or more triangles, and monitoring changes in location of the one or more wheels with respect to the polygon; and determining the one or more states of the one or more wheels based on the changes in location of the one or more wheels with respect to the polygon.

16. The system of claim 15, wherein the processor is further configured to at least facilitate:

extraction, super position and comparison of the one or more triangles in the region of the camera images, determining a centerline associated with the triangle, and monitoring changes in location of the one or more wheels with respect to the centerline of the triangle; and determining the one or more states of the one or more wheels based on the changes in location of the one or more wheels with respect to the centerline of the triangle.

17. The system of claim 16, wherein the processor is further configured to at least facilitate:

determining a number of times in which the one or more wheels have contacted an obstacle along a roadway in which the vehicle is travelling, based on how many times the one or more wheels have crossed the centerline of the triangle in the camera images; and determining of the one or more states of the one or more wheels based on how many times the one or more wheels have crossed the centerline of the triangle in the camera images.

18. A vehicle comprising:

a body;

a drive system configured to move the body;

one or more automotive equipped cameras configured to obtain camera images during operation of the vehicle, the camera images including a view of one or more wheels of the vehicle; and a processor that is coupled to the one or more cameras and that is configured to at least facilitate:

processing the camera images, including by monitoring changes in location of the one or more wheels with respect to one or more triangles in the camera images; and determining one or more states of the one or more wheels, including an alignment thereof, a health thereof, or both, based on the processing of the camera images, including based on the changes in the location of the one or more wheels with respect to the one or more triangles.

19. The vehicle of claim 18, wherein the processor is configured to at least facilitate determining the one or more states of the one or more wheels based at least in part on a comparison of the camera images with a baseline camera image stored in a computer memory.

20. The vehicle of claim 18, wherein the one or more cameras are protruding from or located on a fender or pillar of the vehicle.

* * * * *